US012346046B2

(12) United States Patent
Asaka et al.

(10) Patent No.: US 12,346,046 B2
(45) Date of Patent: Jul. 1, 2025

(54) FIXING FILM

(71) Applicant: CANON KABUSHIKI KAISHA, Tokyo (JP)

(72) Inventors: Akeshi Asaka, Chiba (JP); Hiroki Muramatsu, Tokyo (JP); Naoki Akiyama, Ibaraki (JP); Hiroto Sugimoto, Ibaraki (JP); Yasuhiro Miyahara, Tokyo (JP); Noriaki Kobayashi, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/869,453

(22) Filed: Jul. 20, 2022

(65) Prior Publication Data

US 2023/0051709 A1 Feb. 16, 2023

(30) Foreign Application Priority Data

Jul. 28, 2021 (JP) ................................ 2021-123507

(51) Int. Cl.
*G03G 15/20* (2006.01)

(52) U.S. Cl.
CPC ....... *G03G 15/206* (2013.01); *G03G 15/2057* (2013.01)

(58) Field of Classification Search
CPC ........... G03G 15/2053; G03G 15/2057; G03G 15/206; G03G 2215/2048; G03G 2215/2035
See application file for complete search history.

(56) References Cited

U.S. PATENT DOCUMENTS

2009/0092426 A1* 4/2009 Nishizawa ......... G03G 15/2057 399/331
2012/0094081 A1* 4/2012 Kelly ................. G03G 15/2057 427/540
2012/0244469 A1* 9/2012 Zwartz ............... G03G 15/2057 430/124.23
2015/0198915 A1* 7/2015 Wu ...................... G03G 15/206 252/500
2015/0241825 A1* 8/2015 Miura ................ G03G 15/2057 399/333
2017/0090370 A1* 3/2017 Shinagawa .......... G03G 15/206

FOREIGN PATENT DOCUMENTS

JP 2011197507 A 10/2011

* cited by examiner

*Primary Examiner* — Sandra Brase

(74) *Attorney, Agent, or Firm* — Canon U.S.A., Inc. IP Division

(57) ABSTRACT

A fixing film includes a cylindrical base layer, an elastic layer formed on an outer peripheral surface of the cylindrical base layer, and a separation layer formed on an outer peripheral surface of the elastic layer. The separation layer includes fluororesin, and a degree of orientation of the fluororesin is greater than or equal to 40% and smaller than or equal to 59%.

6 Claims, 4 Drawing Sheets

FIXING FILM

BACKGROUND OF THE INVENTION

Field of the Invention

The present disclosure relates to a fixing film used for a heat-fixing device in an image forming apparatus using an electrophotographic process.

Description of the Related Art

An electrophotographic image forming apparatus includes a fixing device that fixes a toner image formed on a recording material (hereinafter referred to as a sheet) onto the sheet by heating and pressing the toner image. This fixing device includes fixing members, such as a heating roller (heating film) and a pressure roller (pressure film), and performs a fixation process at a position (fixing nip portion) where the fixing members are brought into pressure contact with each other.

An example of the fixing device is a film heating type device. This device includes a heater as a heating member (heating source) including a heating resistor member on a ceramic substrate. The device also includes an endless fixing film as a heating member that rotates and travels while including and contacting this heater. The device also includes a pressure roller (pressure rotary member) as a nip portion forming member that is in pressure contact with the fixing film and rotationally drives the fixing film. In this film heating type device, lower thermal capacity and downsizing of the fixing film can be achieved. This enables energy saving in the fixing device and reduction of a time (warm-up time) required until the temperature of the fixing film reaches a predetermined temperature enough to heat-fix the toner image.

As a film base layer, a heat-resistant resin material such as polyimide, a metal material such as electroformed nickel or stainless steel (SUS), or other metal material is used. On the base layer formed in a film shape, an elastic layer formed of heat-resistant rubber, such as silicone rubber, is provided. By providing the elastic layer, when a sheet on which toner is transferred passes through a nip portion, the surface of each fixing member is deformed along the toner image on the sheet due to the flexibility of the rubber of the elastic layer, and a contact area is increased, which leads to a reduction in contact heat resistance. With this configuration, toner can be evenly melted and fixed onto a sheet, so that an excellent image with high glossiness can be obtained.

In such a fixing member, a separation layer is provided on the surface of the fixing member to provide separability with respect to toner. As a material constituting the separation layer, for example, fluororesin such as tetrafluoroethylene-perfluoroalkyl vinyl ether copolymer (PFA) is used. As a method for forming the separation layer in the fixing member in which the separation layer is formed on the surface of the elastic layer, a method is used in which a dispersion liquid (aqueous dispersion paint) or powdery paint, which contains the above-described fluororesin as a main component, is coated on the surface of the elastic layer and the coating is heated to a melting point or higher to form a film. Alternatively, a method is used in which a fluororesin (mainly PFA) tube separately produced by extrusion molding is coated on the surface of the elastic layer.

However, fluororesin required for ensuring the separability has low thermal conductivity, and thus the use of fluororesin may lead to a decrease in heating efficiency. The use of fluororesin for the separation layer may lead to a decrease in flexibility. This may also lead to a deterioration in image quality due to uneven glossiness or the like. In order to prevent the deterioration in image quality, it may therefore be desirable to form the separation layer as thin as possible. However, if the separation layer is made extremely thin, the durability life of the separation layer can be decreased by wearing due to abrasion with a sheet. In the case of an extrusion tube, a crack is more likely to occur in an orientation direction (extrusion direction) associated with molecular orientation during extrusion. This is caused due to a difference in expansion coefficient between the extrusion tube and elastic layer rubber in a fixing temperature range, or due to a bending stress to be repeatedly applied in the vicinity of the nip portion when the film is rotationally driven. If a crack occurs in the separation layer, the image quality can be degraded.

Japanese Patent Application Laid-Open No. 2011-197507 discusses a technique for reducing the orientation by reheating a fixing film coated with a PFA tube to a melting point or higher and then rapidly cooling the fixing film. According to this technique, a molecular motion occurs when PFA is remelted, which makes it possible to erase a history of orientation during tube extrusion.

However, if the orientation is greatly reduced by remelting PFA, the abrasion resistance to a sheet that is maintained by the orientation can be greatly reduced. Accordingly, there is an issue that it is difficult to achieve both an improvement in resistance to a crack and an improvement in resistance to abrasion (durability life) with a sheet as described above.

SUMMARY OF THE INVENTION

The present disclosure is directed to providing a fixing film and a heat-fixing device with an improved resistance to abrasion with a sheet and an improved resistance to a crack.

According to an aspect of the present disclosure, a fixing film includes a cylindrical base layer, an elastic layer formed on an outer peripheral surface of the cylindrical base layer, and a separation layer formed on an outer peripheral surface of the elastic layer. The separation layer includes fluororesin, and a degree of orientation of the fluororesin is greater than or equal to 40% and smaller than or equal to 59%.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the drawings.

[Image Forming Apparatus]

Figure 1:
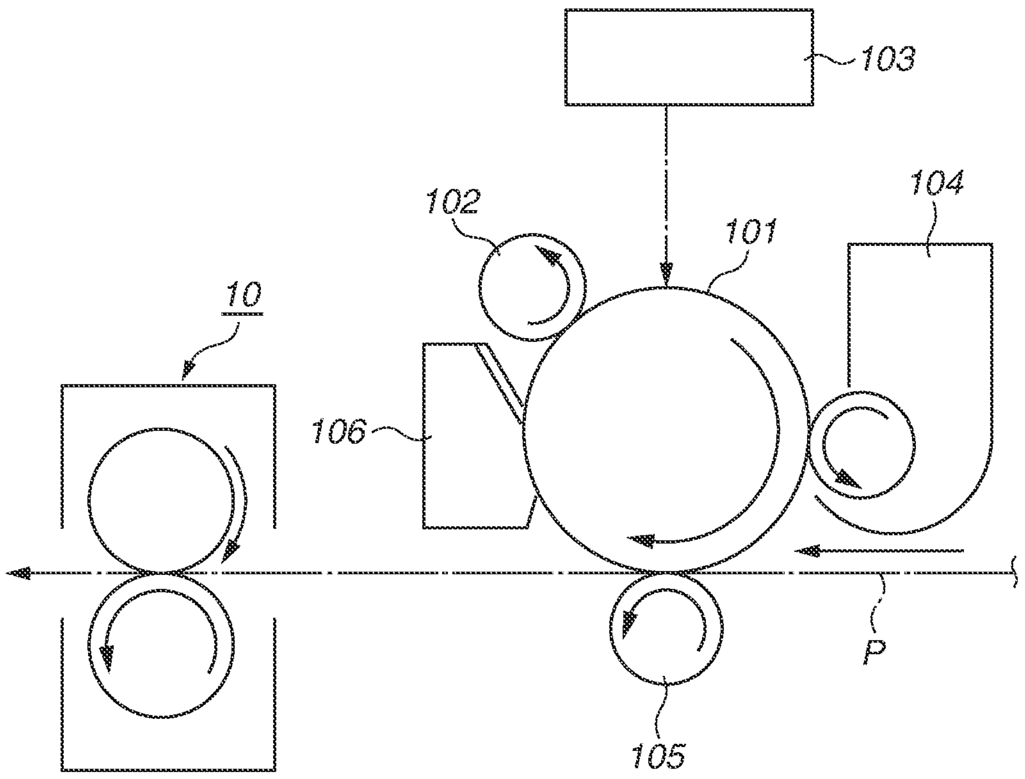
FIG. 1 is a schematic view illustrating a configuration example of an electrophotographic image forming apparatus.
Figure 2:
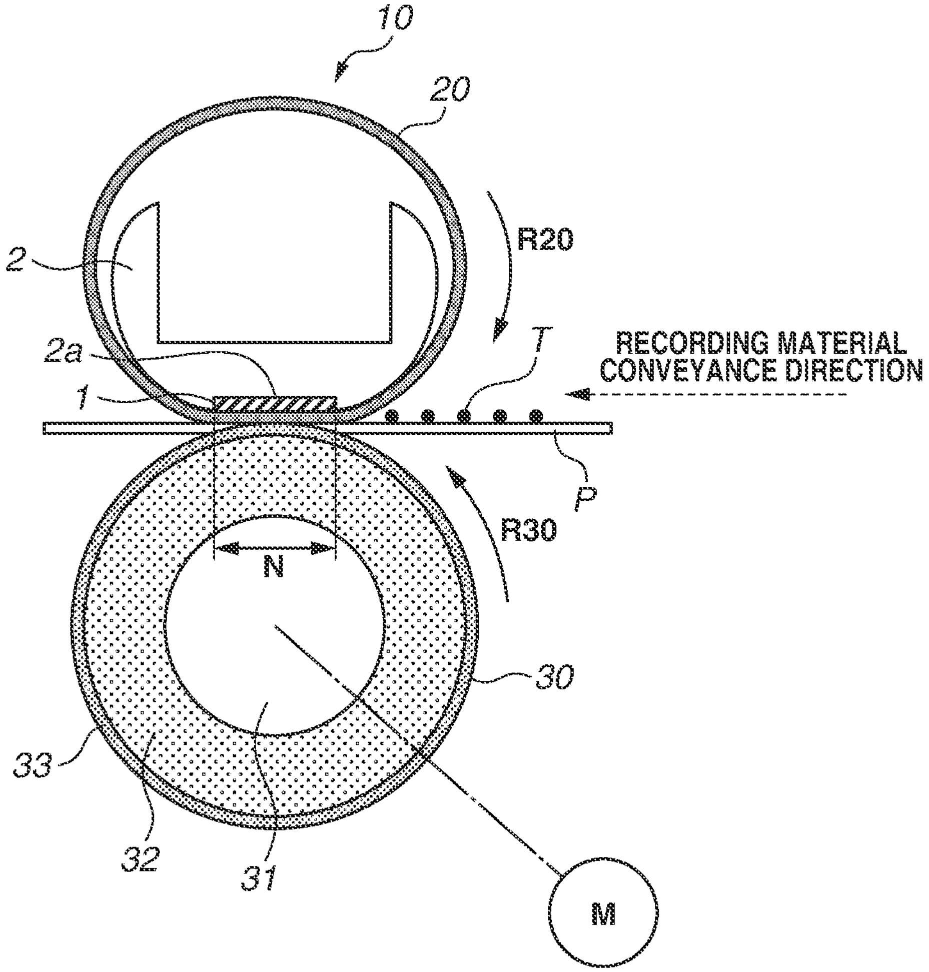
FIG. 2 is a schematic cross-sectional view illustrating a configuration of a fixing device according to an exemplary embodiment.

FIG. 1 is a schematic view illustrating a configuration example of an image forming apparatus. This image forming apparatus is an electrophotographic image forming apparatus and includes a rotatable electrophotographic photosensitive member 101. The image forming apparatus also includes a charging device 102, an image exposure unit 103, and a developing unit. The charging device 102 and the image exposure unit 103 each function as an electrostatic latent image forming unit that forms an electrostatic latent image on the photosensitive member 101. The developing unit 104 develops the electrostatic latent image formed on the photosensitive member 101 into a toner image (developer image). The image forming apparatus also includes a transfer unit 105 that transfers the toner image formed on the photosensitive member 101 onto a sheet-like recording material (hereinafter referred to as paper or sheet) P. The image forming apparatus also includes a cleaning unit 106 and a fixing device 10 (FIG. 2). The cleaning unit 106 cleans the surface of the photosensitive member 101 after the toner image is transferred. The fixing device 10 functions as a fixing unit that fixes a toner image T onto a sheet P.

[Fixing Device]

FIG. 2 is a schematic cross-sectional view illustrating a schematic configuration of the fixing device 10 according to an exemplary embodiment of the present disclosure. In the following description, an axial direction of the fixing device 10 and members constituting the fixing device 10 is orthogonal to a sheet conveyance direction on a sheet surface. A length of the fixing device 10 and members constituting the fixing device 10 corresponds to a size in the axial direction. The fixing device 10 is a belt (film) heating type fixing device. The fixing device 10 includes a ceramic heater (hereinafter referred to as a heater) 1 as a heating member, and a film guide 2 that also functions as a heating member supporting member. The fixing device 10 also includes an endless (cylindrical), flexible, and heat-resistant fixing film 20 as a fixing member. The fixing device 10 also includes a pressure roller 30 as a nip portion forming member that is in pressure contact with the fixing film 20 and forms a nip portion (fixing nip portion) N.

The heater 1 is an elongated plate-like member extending along a longitudinal direction (direction perpendicular to the drawing sheet) of the fixing film 20. The heater 1 includes a heat generation source, such as a heating resistor member that generates heat when the heater 1 is energized by a power feed unit (not illustrated), and the temperature of the heater 1 is steeply increased by power feeding. The temperature of the heater 1 is detected by a temperature detection unit (not illustrated), and the detected temperature information is input to a control unit (not illustrated). The control unit controls power to be supplied to the heat generation source from the power feed unit so that the detected temperature input from the temperature detection unit can be maintained at a predetermined fixing temperature, thereby adjusting the temperature of the heater 1 to a predetermined temperature.

The heater 1 is supported by the film guide 2 formed in a substantially semicircular trough shape in cross section with a heat-resistant material having rigidity. Specifically, a groove portion 2*a* is provided on an outer surface of the film guide 2, along the longitudinal direction of the film guide 2, and the heater 1 is fit into the groove portion 2*a*.

As described below, the fixing film 20 includes a ring-shaped (cylindrical) base layer 21, an elastic layer 22, a separation layer 24, and the like (FIG. 3) that are formed in this order from the inside to the outside of the fixing film 20. The fixing film 20 is an endless film having an inner peripheral surface on which the heater 1 and the film guide 2 slide in a state of use, and is externally fitted to the outer periphery of the film guide 2, which supports the heater 1, with an allowance in circumferential length.

The heater 1 and the pressure roller 30 are in pressure contact with each other through the fixing film 20, and the nip portion N is formed between the fixing film 20 and the pressure roller 30. The pressure roller 30 is rotationally driven at a predetermined peripheral speed in a counter-clockwise direction indicated by an arrow R30 by a rotational driving device M such as a motor. The fixing film 20 is driven by the rotational driving of the pressure roller 30 and is rotated in a clockwise direction indicated by an arrow R20 while the inner surface of the fixing film 20 slides in close contact with the surface of the heater 1. Both end portions of the fixing film 20 in the longitudinal direction are rotatably supported by flanges (not illustrated) that are regulation members fixed to the fixing device 10.

The film guide 2 not only functions as a support member for the heater 1, but also functions as a rotation guide member for the fixing film 20. A lubricant (grease) is applied onto the inner peripheral surface of the fixing film 20 to ensure sliding properties between the heater 1 and the holder 2.

The pressure roller 30 includes a base layer 31 having a solid rod shape, a cylindrical (pipe) shape, or the like, an elastic layer 32, and a separation layer 33, which are formed in this order formed from the inside to the outside of the pressure roller 30. The pressure roller 30 is rotationally driven during use by the rotational driving device M such as the motor. For this reason, both end portions of the base layer 31 in the axial direction are rotatably supported via bearing members by a fixing portion (not illustrated), such as a frame of the fixing device 10.

The pressure roller 30 is disposed at a position opposing the heater 1, which is supported by the film guide 2, with respect to the fixing film 20. A pressure mechanism (not illustrated) applies a predetermined pressure to each of the pressure roller 30 and the fixing film 20, thereby bringing the pressure roller 30 and the fixing film 20 into pressure contact with each other, so that the elastic layers 22 and 32 of the pressure roller 30 and the fixing film 20, respectively, are elastically deformed. As a result, the nip portion N with a predetermined width in the sheet conveyance direction is formed between the pressure roller 30 and the fixing film 20.

The pressure contact between the fixing film 20 serving as a heating member and the pressure roller 30 serving as a nip forming member may be achieved by a configuration in which the pressure roller 30 is brought into pressure contact with the fixing film 20 with a predetermined pressure, or by a configuration in which the fixing film 20 is brought into pressure contact with the pressure roller 30, or by a configuration in which both the fixing film 20 and the pressure roller 30 are brought into pressure contact with each other with the predetermined pressure.

When the pressure roller 30 is rotationally driven by the rotational driving device M, the pressure roller 30 nips and conveys the sheet P at the nip portion N formed between the pressure roller 30 and the fixing film 20 rotated by the pressure roller 30. The fixing film 20 is heated by the heater 1 until the temperature of the surface of the fixing film 20 reaches a predetermined temperature (e.g., 200° C.). In this state, the sheet P carrying an unfixed toner image T thereon is introduced into the nip portion N and is nipped and conveyed, and thereby the unfixed toner image T on the sheet P is heated and pressed. The unfixed toner T is then melted and color-mixed, and thereafter the unfixed toner T is cooled down to thereby fix the toner image as a fixed image onto the sheet P.

[Fixing Film]

The fixing film 20 according to the present exemplary embodiment will now be described in detail.

Figure 3:
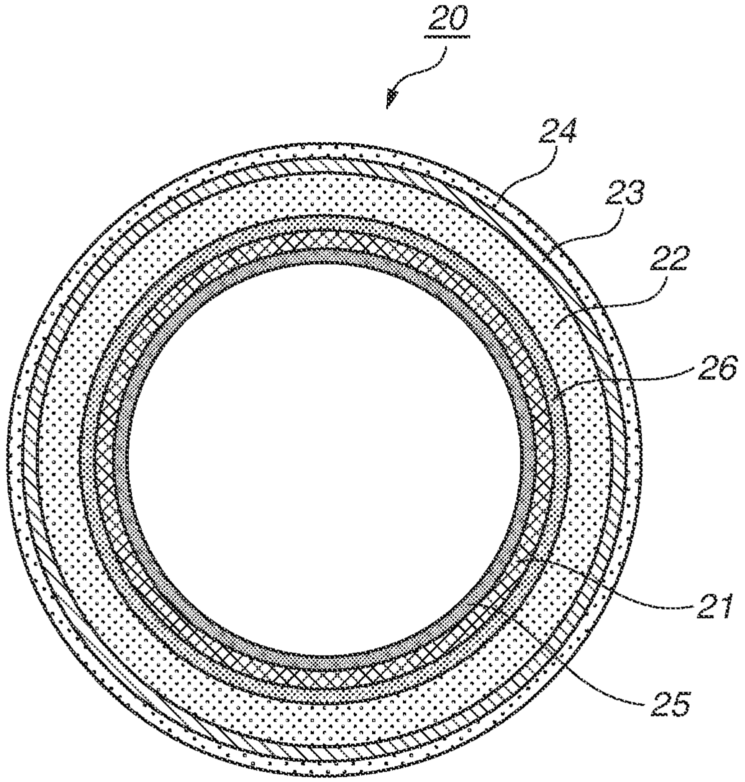
FIG. 3 is a schematic sectional view illustrating a configuration of a fixing film.

FIG. 3 is a schematic sectional view illustrating a layer configuration of the fixing film 20 as a fixing member according to the present exemplary embodiment. The fixing film 20 includes the base layer (cylindrical base layer) 21, an inner surface sliding layer 25 disposed on the inner peripheral surface of the base layer 21, a primer layer 26 that covers the outer peripheral surface of the base layer 21, and an elastic layer 22 disposed on the primer layer 26. The fixing film 20 also includes a fluororesin tube 24 functioning as a separation layer, and an adhesive layer 23 for fixing the separation layer 24 onto the elastic layer 22.

Each of the layers constituting the fixing film 20 will now be described in detail.

(3-1) Base Layer 21

As the base layer 21 of the fixing film 20, in view of necessity of heat resistance and flex resistance, a heat-resistant resin material is used, such as polyimide, polyamide-imide, or polyether ether ketone (PEEK). Also in view of thermal conductivity, a metallic material can be suitably used, such as stainless steel (SUS), nickel, or a nickel alloy, which is higher in thermal conductivity than the heat-resistant resin material. The base layer 21 may desirably have a high mechanical strength while having small thermal capacitance. Accordingly, the base layer 21 may desirably have a thickness of 5 micrometers (μm) to 100 μm, and preferably, 20 μm to 85 μm. In the present exemplary embodiment, a SUS material with an inner diameter of 24 mm and a thickness of 30 μm is used as the base layer 21.

(3-2) Inner Surface Sliding Layer 25

As a material of the inner surface sliding layer 25, a resin material can be suitably used, such as a polyimide resin material having high durability and high heat resistance in combination. In the present exemplary embodiment, a polyimide precursor solution is applied onto the inner peripheral surface of the base layer 21. The polyimide precursor solution is obtained by substantially equimolar reaction in an organic polar solvent between aromatic diamine and aromatic tetracarboxylic dianhydride or its derivative. After the application, the solvent is dried and is subjected to dewatering cyclization reaction (imidization reaction) by heating, thereby forming the inner surface sliding layer 25. The inner surface sliding layer 25 is gradually abraded due to sliding with the heater 1. Thus, the inner surface sliding layer 25 may desirably have a thickness large enough to function as a sliding layer with durability. In contrast, if the thickness of the inner surface sliding layer 25 is extremely large, the inner surface sliding layer 25 may function as a heat-resistant layer that blocks heat supply from the heater 1. For this reason, the inner surface sliding layer 25 may desirably have a thickness of 5 μm to 20 μm, and preferably, 10 μm to 15 μm. In the present exemplary embodiment, the inner surface sliding layer 25 has a thickness of 12 μm.

(3-3) Elastic Layer 22

The outer peripheral surface of the base layer 21 is provided with the elastic layer 22 through the primer layer 26. The elastic layer 22 uniformly applies heat to the unfixed toner T such that the elastic layer 22 encloses the unfixed toner T on the sheet P when the sheet P passes through the nip portion N. This function of the elastic layer 22 makes it possible to obtain an excellent image with high glossiness. As a material of the elastic layer 22, liquid silicone rubber of an addition reaction cross-linking type can be preferably used for such reasons that the material can be easily processed, the material can be processed with high dimensional accuracy, and no reaction by-product is formed during heat-curing. The liquid silicone rubber of the addition reaction cross-linking type may contain, for example, organopolysiloxane and organo-hydrogen polysiloxane, and may further contain a catalyst and other additives. The organopolysiloxane is a base polymer using silicone rubber as a material, and may preferably have a number average molecular weight of 5,000 to 100,000 and a weight average molecular weight of 10,000 to 500,000.

The liquid silicone rubber is a polymer having flowability at room temperature, but is cured by heating and has moderately low hardness after curing and also has a sufficient heat-resistant property and a deformation restoring force. For this reason, the liquid silicone rubber may suitably be used not only in the elastic layer 22, but also in the elastic layer 32 of the pressure roller 30 described below. If the elastic layer 22 is formed of silicone rubber alone, the elastic layer 22 has low thermal conductivity. When the thermal conductivity of the elastic layer 22 is low, heat generated by the heater 1 is not readily conducted to the sheet P through the fixing film 20. Thus, heating becomes insufficient when the toner image is fixed onto the sheet P, and a defective image can be formed due to uneven fixing or the like, accordingly.

To enhance the thermal conductivity of the elastic layer 22, for example, a granular high thermal conductive filler having high thermal conductivity is mixed and dispersed in the elastic layer 22. Examples of the granular high thermal conductive filler include, silicon carbide (SiC), zinc oxide (ZnO), alumina ($Al_2O_3$), aluminum nitride (AlN), magnesium oxide (MgO), and carbon. These materials can be used singly or in a mixture of two or more kinds. From viewpoints of handing and dispersion property, the high thermal conductive filler may preferably have an average diameter of 1 μm or more and 50 μm or less.

The shape of the high thermal conductive filler may be, a spherical shape, a pulverized shape, a needle shape, a plate shape, or a whisker shape, but a spherical shape may be preferably used from the viewpoint of the dispersion property. The elastic layer 22 may desirably have a thickness of 30 μm to 500 μm, and preferably, 100 μm to 300 μm, to obtain an excellent image with sufficient elasticity of the elastic layer 22 and to prevent a delay of time for the temperature to reach a predetermined temperature by heating due to an increase in thermal capacity. In the present exemplary embodiment, alumina is used for the high thermal conductive filler, and the elastic layer 22 has a thermal conductivity of 1.0 W/mK and a thickness of 250 μm.

(3-4) Adhesive Layer 23

The adhesive layer 23, which is used for fixing the fluororesin tube serving as the separation layer 24 onto the cured silicone rubber serving as the elastic layer 22, was applied onto the surface of the elastic layer 22 with a thickness of 1 μm to 10 μm (adhesive application process of applying an adhesive onto the outer peripheral surface of the cylindrical elastic layer). In the present exemplary embodiment, the adhesive layer 23 is formed of a cured product of an addition-curable silicone rubber adhesive. The adhesive layer 23 formed of the addition-curable silicone rubber adhesive contains the addition-curable silicone rubber in which a self-adhesive component is contained. Specifically, the adhesive layer 23 contains organopolysiloxane having an unsaturated hydrocarbon group represented by a vinyl group, hydrogen organopolysiloxane, and a platinum compound as a cross-linking catalyst. This material is cured by addition reaction. As such an adhesive, a known adhesive can be used.

(3-5) Separation Layer 24

As a material of a surface layer (toner separation layer) of the fixing member, the fluororesin tube 24 produced by extrusion molding is used from viewpoints of molding properties and toner separability. As a fluororesin material, a tetrafluoroethylene-perfluoroalkyl vinyl ether copolymer (PFA) that is excellent in heat resistance may be suitably used (PFA tube). The type of copolymerization of PFA used as a material is not particularly limited. For example, random polymerization, block polymerization, or graft polymerization can be used. The molar ratio of tetrafluoroethylene (TFE) and perfluoroalkyl vinyl ether (PAVE) in PFA used as a material is not particularly limited. For example, a material having the TFE/PAVE molar ratio of 94/6 to 99/1 can be suitably used.

Other examples of the fluororesin material include a tetrafluoroethylene/hexafluoropropylene copolymer (FEP), polytetrafluoroethylene (PTFE), an ethylene/tetrafluoroethylene copolymer (ETFE), polychlorotrifluoroethylene (PCTFE), an ethylene/chlorotrifluoroethylene copolymer (ECTFE), and polyvinylidene fluoride (PVDF). These fluororesin materials can be used singly or in combination of two or more kinds. To maintain the function of the separation layer with durability in consideration of abrasion due to sliding with a sheet, the separation layer 24 may desirably have a thickness of 10 μm or more. If the thickness of the separation layer 24 is extremely large, a decrease in energy saving and deterioration in image quality may be caused due to a decrease in heating efficiency caused by an increase in heat resistance, or due to an increase in contact heat resistance with a sheet caused by lack of flexibility. For this reason, the separation layer 24 may desirably have a thickness of 30 μm or less. In the present exemplary embodiment, the PFA tube obtained by extrusion molding and having a thickness of 15 μm to 25 μm was used.

Evaluations of the fixing film 20 formed by stacking the above-described layers and the separation layer 24 will be described below with reference to Examples 1 to 4 and Comparative Examples 1 to 4 described below.

[Degree of Orientation of Separation Layer]

The degree of orientation of the separation layer 24 was obtained by calculation based on a β-rotation angle distribution of diffraction intensities using an X-ray diffraction apparatus (MiniFlex manufactured by Rigaku Corporation). PFA that was separated from the fixing film as the separation layer was set on a fiber sample stage, and a strength distribution along a Debye ring was measured when the separation layer was rotated by 360° (β-rotation) by a penetration method in a state where 2θ was fixed at a peak in the vicinity of 18°, and the degree of orientation was calculated by the following expression.

$$H=[(360-\Sigma W/360)]\times 100,$$

where H represents a degree of orientation[%], and W represents a half width.

Figure 4:
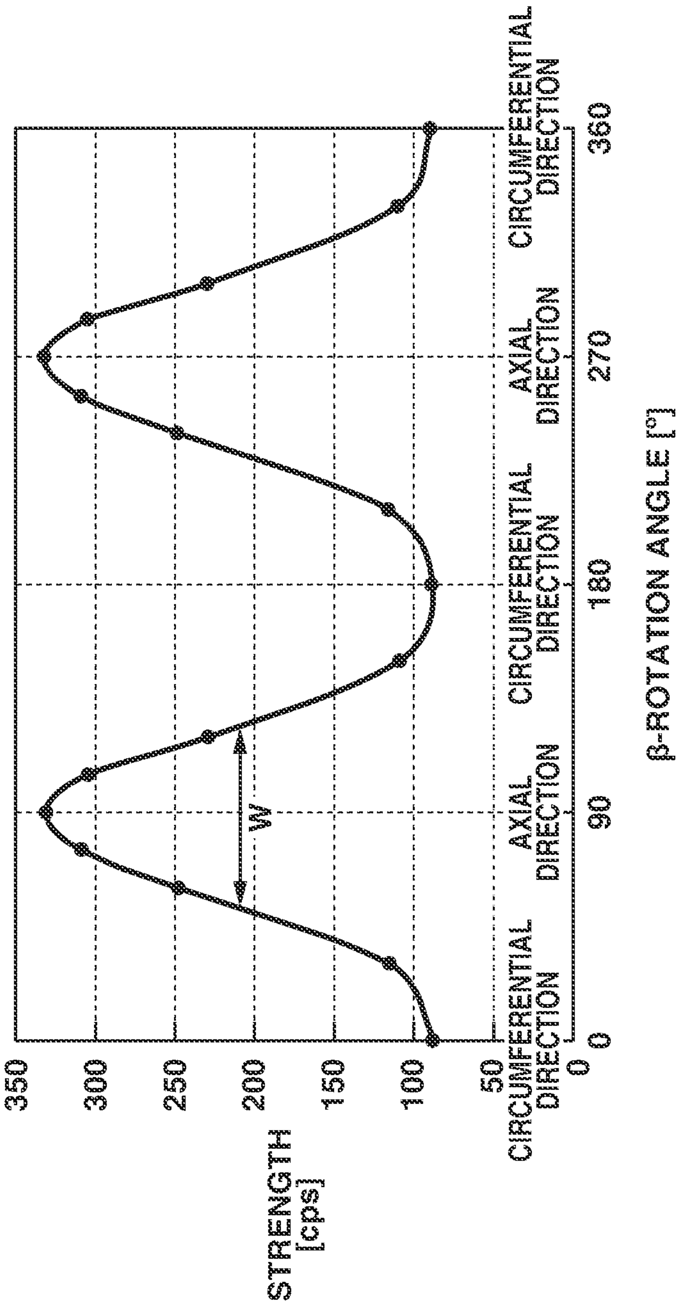
FIG. 4 is a graph illustrating an example of results of measuring a degree of orientation of a separation layer according to the exemplary embodiment.

FIG. 4 illustrates an example of the measurement result.

[Thermal Diffusivity of Separation Layer]

The thermal diffusivity in a thickness direction of the separation layer 24 was measured with a periodic heating method thermal diffusivity measurement apparatus (FTC-1 manufactured by ADVANCE RIKO, Inc.). The measurements of the separation layer 24 used in Examples and Comparative Examples were conducted at a measurement temperature of 170° C. and a measurement frequency of 60 Hz to 100 Hz.

[Durability Evaluation of Fixing Film]

A durability evaluation of the fixing film 20 was conducted using the fixing device 10 of the film heating type illustrated in FIG. 2 in which the fixing film 20 according to Examples and Comparative Examples was incorporated. In a state where a pressure of about 156.8 N was applied to one end side, that is, a total pressure of about 313.6 N (32 kgf) was applied, the fixing film 20 was rotationally driven by setting the surface movement speed (peripheral speed) of the pressure roller to 246 millimeters per second (mm/sec). In a state where the surface temperature of the fixing film 20 at a sheet-passing portion was adjusted to 170° C., sheets with the same size (A4, landscape) were passed in succession.

Sheet supply durability was evaluated using "○" and "x". That is, "○" indicates a case where 500,000 sheets or more were passed without causing abrasion at an end of each sheet, and "x" indicates a case where an end of each sheet was abraded during a durability test.

A solid blue image was formed every 100,000 sheets of paper (SRA3 or paper of 13 inch×19 inch) having a larger width than the width of A4 (landscape) paper of 128 $g/m^2$ of OK Top Coated Paper (manufactured by Oji Paper Co., Ltd.). The evaluation was conducted using "x" and "○". That is, "x" indicates a case where a flaw or a sharp streak caused due to a crack in the separation layer in the fixing film axial direction (PFA tube extrusion direction) was observed on the image, and "○" indicates a case where no flaw or sharp streak was observed.

[Evaluation of Uneven Melting of Toner]

The followability of the fixing film 20 to unevenness of a sheet can be set as an index by observing a toner melting state after the toner image formed on the sheet is fixed.

Similarly to the durability evaluation, an uneven melting evaluation image was fixed onto ten sheets in succession at an input voltage of 100 volts (V) under an environment where the temperature was 10° C. and the relative humidity was 50% by using the fixing device 10 in which the fixing film 20 was incorporated. Paper used for the evaluation was A4-size recycled paper (Product Name: Recycled Paper GF-R100 manufactured by Canon Inc. having a thickness of 92 μm, a grammage of 66 $g/m^2$, a percentage of recycled pulp content in paper of 70%, and a Bekk smoothness of 23 seconds (measured by a method compliant with Japanese Industrial Standards (JIS) P8119)). The term "uneven melting evaluation image" used herein refers to an image where a patch image of 10 millimeters (mm)×10 mm that is formed using cyan toner and magenta toner with a density of 100% is located in the vicinity of the center of a paper surface.

As a rough indication of uneven melting, when sufficient heat and pressure are applied to an image portion where two color images are formed, the two colors of toner are melted and mixed. Particularly, if heat is applied but no pressure is applied to a concave portion in the unevenness of a sheet, a toner grain boundary remains after the fixing process, which may lead to uneven melting in a state where the different colors of toner are not sufficiently mixed. If the fixing member cannot sufficiently follow the unevenness of a sheet, a pressure is applied to a convex portion in the unevenness of the sheet and the different colors of toner are mixed. However, in the concave portion, the different colors of toner cannot be sufficiently mixed. The determination of the followability to the unevenness of a sheet was made by observing the melting state in an image formation range.

After the uneven melting evaluation image was printed on ten sheets in succession, the tenth sheet was taken out as a sample and the image forming portion on the sheet was observed with an optical microscope to evaluate uneven melting. Evaluation criteria are as follows (see "uneven melting" in Table 1).

Evaluation Ranks

A: A state where almost no toner grain boundary is observed even in concave portions of paper fiber, and different colors of toner are mixed in both concave and convex portions.

B: A state where a toner grain boundary is observed in some of concave portions of paper fiber, but different colors of toner are mixed in most of the concave and convex portions.

C: A state where different colors of toner are mixed only in the convex portions of paper fiber, and a toner grain boundary observed in many of the concave portions.

PFA tubes each serving as the separation layer of the fixing film 20 according to Examples and Comparative Examples have different degrees of orientation and different thermal diffusivities after formation by changing extrusion molding conditions.

TABLE 1

| | | | | | Durability | |
|---|---|---|---|---|---|---|
| | Thickness of Release Layer | Degree of Orientation % | Thermal Diffusivity $m^2/s$ | Toner Uneven Melting | Sheet Supply Durability (Sheet Abrasion Resistance) | Image Streak due to Crack after Durability Test |
| Example 1 | 15 | 40 | 6.8E−08 | A | ○ | ○ |
| Example 2 | 25 | 57 | 6.0E−08 | A | ○ | ○ |
| Example 3 | 15 | 59 | 5.9E−08 | A | ○ | ○ |
| Example 4 | 20 | 48 | 6.5E−08 | A | ○ | ○ |
| Comparative Example 1 | 15 | 38 | 6.9E−08 | A | x | ○ |
| Comparative Example 2 | 25 | 65 | 5.6E−08 | C | ○ | x |
| Comparative Example 3 | 15 | 62 | 5.9E−08 | A | ○ | x |
| Comparative Example 4 | 20 | 70 | 5.0E−08 | B | ○ | x |

According to the above-descried Examples, the fixing film 20 can have sufficient sheet supply durability to sheet abrasion properties and prevent a defective image due to a crack.

On the other hand, in Comparative Example 1 in which the degree of orientation of the separation layer is less than 40% (38%), the resistance to abrasion with a sheet is insufficient and thus desired sheet supply durability cannot be obtained. In Comparative Examples 2 to 4 in which the degree of orientation of the separation layer is more than or equal to 60%, a crack occurs in the separation layer during a durability test, which appears as a streak on the image. In Comparative Examples 2 and 4 in which the degree of orientation is large and the thickness of the separation layer is also large, i.e., more than or equal to 20 μm, the flexibility of the separation layer is impaired and the followability to the unevenness of a sheet is insufficient and thus uneven melting of toner becomes noticeable.

According to an aspect of the present disclosure, it is possible to provide a fixing film and a heat-fixing device including a separation layer that has a resistance to abrasion with a sheet and a resistance to a crack and can stably provide an excellent fixing performance.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-123507, filed Jul. 28, 2021, which is hereby incorporated by reference herein in its entirety.

What is claimed is:

1. A fixing film comprising:

a cylindrical base layer;

an elastic layer formed on an outer peripheral surface of the cylindrical base layer, the elastic layer having a thickness of 30 μm to 500 μm and being formed of rubber including filler; and a separation layer formed on an outer peripheral surface of the elastic layer and having a thickness of 15 to 25 μm, wherein the separation layer includes fluororesin, and a degree of orientation of the fluororesin is greater than or equal to 40% and smaller than or equal to 59%, and wherein thermal diffusivity in a thickness direction of the separation layer at a temperature of 170° C. is $5.9\times10^{-8}$ $m^2/s$ to $6.8\times10^{-8}$ $m^2/s$.

2. The fixing film according to claim 1, wherein the fluororesin in the separation layer includes tetrafluoroethylene-perfluoroalkyl vinyl ether copolymer (PFA).

3. The fixing film according to claim 2, wherein the PFA as the separation layer is a PFA tube produced by extrusion molding.

4. The fixing film according to claim 1, wherein the filler included in the elastic layer has an average particle diameter of 1 μm or more and 50 μm or less.

5. The fixing film according to claim 1, wherein the fixing film is a constituent member of a fixing apparatus configured to fix a toner image transferred onto a recording material with heat, and wherein the separation layer comes into contact with a surface on which the toner image is formed on the recording material when an image is formed on one side.

6. The fixing film according to claim 1, wherein a degree of orientation of the fluororesin of the separation layer in an extrusion direction is greater than or equal to 40% and smaller than or equal to 59%.

* * * * *